United States Patent [19]

Drake et al.

[11] Patent Number: 4,639,748

[45] Date of Patent: Jan. 27, 1987

[54] INK JET PRINTHEAD WITH INTEGRAL INK FILTER

[75] Inventors: Donald J. Drake, Rochester; William G. Hawkins; Michael R. Campanelli, both of Webster, all of N.Y.

[73] Assignee: Xerox Corporation, Stamford, Conn.

[21] Appl. No.: 781,554

[22] Filed: Sep. 30, 1985

[51] Int. Cl.[4] .............................................. G01D 15/18

[52] U.S. Cl. ................................ 346/140 R; 156/647; 156/657; 156/662

[58] Field of Search .......................... 346/140, 1.1, 75; 156/647, 654, 657, 662

[56] References Cited

U.S. PATENT DOCUMENTS

| | | | |
|---|---|---|---|
| 4,106,976 | 8/1978 | Chiou | 156/644 |
| 4,157,935 | 6/1979 | Solyst | 156/644 |
| 4,251,824 | 2/1981 | Hara | 346/140 |
| 4,362,599 | 12/1982 | Imaizumi | 156/647 |
| 4,380,770 | 4/1983 | Maruyama | 346/140 |
| 4,438,191 | 3/1984 | Cloutier | 346/140 X |
| 4,463,359 | 7/1984 | Ayata | 346/140 X |
| 4,532,530 | 7/1985 | Hawkins | 346/140 |
| 4,571,599 | 2/1986 | Rezanka | 346/140 |
| 4,601,777 | 7/1986 | Hawkins | 156/657 X |

FOREIGN PATENT DOCUMENTS 56-7874 2/1981 Japan .

OTHER PUBLICATIONS

Bassous, Ernest, Fabrication of Novel Three-Dimensional Microstructures by the Anisotropic Etching of (100) and (110) Silicon, IEEE Transactions on Electron Devices, vol. ED-25, No. 10, Oct. 1978, pp. 1178-1185.

Kuan et al, Two-Sided Groove Etching Method . . . Ink Jet Nozzles, IBM TDB, vol. 21, No. 6, Sep. 1978, pp. 2585-2586.

*Primary Examiner*—Joseph W. Hartary
*Attorney, Agent, or Firm*—Robert A. Chittum

[57] ABSTRACT

An ink jet printhead having an internal, integrated filtering system and fabricating process therefor is disclosed. Each printhead is composed of two parts aligned and bonded together. One part is a substantially flat substrate which contains on a surface thereof a linear array of heating elements and addressing electrodes. The other part is a flat substrate having a set of concurrently etched recesses in one surface. The set of recesses include a parallel array of elongated recesses for use as capillary filled, ink channels having ink droplet emitting nozzles at one end and having interconnection with a common ink supplying manifold recess at the other ends. The manifold recess contains an internal, closed wall defining a chamber with an ink fill hole. Small passageways are formed in the internal chamber walls to permit passage of ink therefrom into the manifold. Each of the passageways have smaller cross-sectional flow areas than the nozzles to filter the ink, while the total cross-sectional flow area of the passageways is larger than the total cross-sectional flow area of the nozzles. Many printheads can be made simultaneously by producing a plurality of sets of heating element arrays with their addressing electrodes on a silicon wafer and by placing alignment marks thereon at predetermined locations. A corresponding plurality of sets of channels and associated manifolds with internal filters are produced in a second silicon wafer and, in one embodiment, alignment openings are etched thereon at predetermined locations. The two wafers are aligned via the alignment openings and alignment marks, then bonded together and diced into many separate printheads.

13 Claims, 12 Drawing Figures

FIG. 9
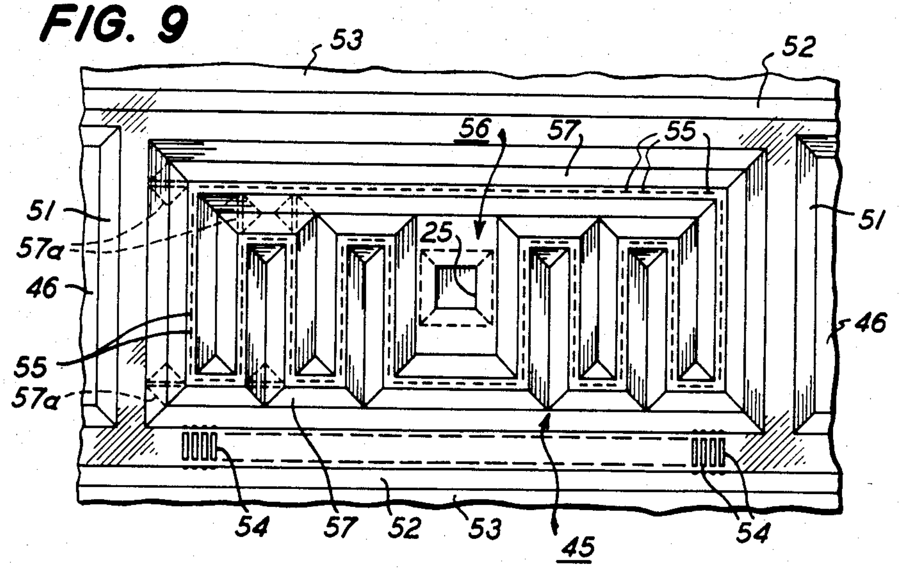
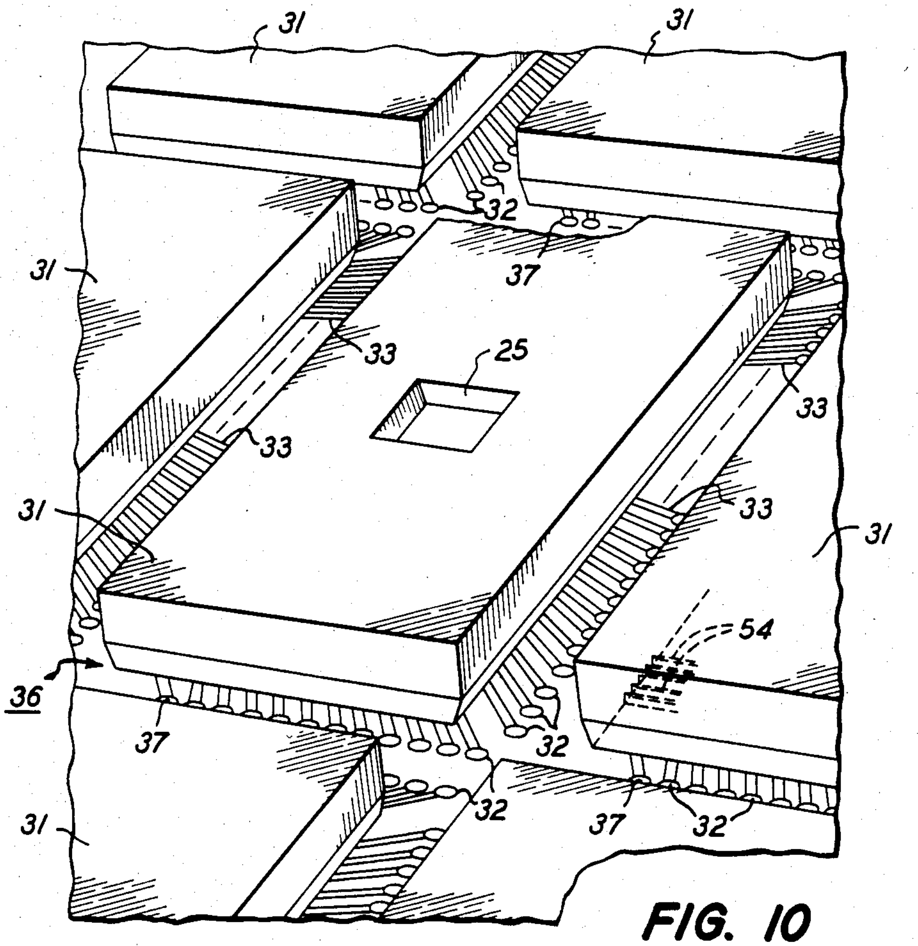
FIG. 10

INK JET PRINTHEAD WITH INTEGRAL INK FILTER

BACKGROUND OF THE INVENTION

1. Field of the Invention

This invention relates to ink jet printing, and more particularly to a thermal ink jet printhead having an integral, internal ink filter and process for fabricating the printhead.

2. Description of the Prior Art

Generally speaking, thermal, drop-on-demand ink jet printing systems use thermal energy pulses to produce vapor bubbles in an ink-filled channel that expels droplets from the channel orifice. This type of ink jet printing is referred to as either thermal ink jet printing or bubble ink jet printing and is the subject matter of the present invention. In existing thermal ink jet printers, the printhead therein comprises one or more ink filled channels, such as disclosed in U.S. Pat. No. 4,463,359 to Ayata et al, communicating with a relatively small ink supply chamber at one end and having an orifice at the opposite end, also referred to as a nozzle. A thermal energy generator, usually a resistor, is located in the channels near the nozzle a predetermined distance therefrom. The resistors are individually addressed with a current pulse to momentarily vaporize the ink and form a bubble which expels an ink droplet. As the bubble grows, the ink bulges from the nozzle and is contained by the surface tension of the ink as a meniscus. As the bubble begins to collapse, the ink still in the channel between the nozzle and bubble starts to move towards the collapsing bubble, causing a volumetric contraction of the ink at the nozzle and resulting in the separation of the bulging ink as a droplet. The acceleration of the ink out of the nozzle while the bubble is growing provides the momentum and velocity of the droplet in a substantially straight line direction towards a recording medium, such as paper.

In U.S. Pat. No. 4,463,359, a thermal ink jet printer is disclosed having one or more ink-filled channels which are replenished by capillary action. A meniscus is formed at each nozzle to prevent ink from weeping therefrom. A resistor or heater is located in each channel at a predetermined distance from the nozzles. Current pulses representative of data signals are applied to the resistors to momentarily vaporize the ink in contact therewith and form a bubble for each current pulse. Ink droplets are expelled from each nozzle by the growth of the bubbles which causes a quantity of ink to bulge from the nozzle and break off into a droplet at the beginning of the bubble collapse. The current pulses are shaped to prevent the meniscus from breaking up and receding too far into the channels, after each droplet is expelled. Various embodiments of linear arrays of thermal ink jet devices are shown such as those having staggered linear arrays attached to the top and bottom of a heat sinking substrate and those having different colored inks for multicolored printing. In one embodiment, a resistor is located in the center of a relatively short channel having nozzles at both ends thereof. Another passageway is connected to the open-ended channel and is perpendicular thereto to form a T-shaped structure. Ink is replenished to the open-ended channel from the passageway by capillary action. Thus, when a bubble is formed in the open-ended channel, two different recording mediums may be printed simultaneously.

U.S. Pat. No. 4,275,290 to Cielo et al discloses a thermally activated liquid ink printing head having a plurality of orifices in a horizontal wall of an ink reservoir. In operation, an electric current pulse heats selected resistors that surround each orifice and vaporizes the nonconductive ink. The vapor condenses on a recording medium, such as paper, spaced above and parallel to the reservoir wall, causing a dark or colored spot representative of a picture element or pixel. Alternatively, the ink may be forced above the orifice by partial vaporization of the ink, so that the ink is transported by a pressure force provided by vapor bubbles. Instead of partially or completely vaporizing the ink, it can be caused to flow out of the orifices by reduction of the surface tension of the ink. By heating the ink in the orifices, the surface tension coefficient decreases and the meniscus curvature increases, eventually reaching the paper surface and printing a spot. A vibrator can be mounted in the reservoir to apply a fluctuating pressure to the ink. The current pulse to the resistors are coincident with the maximum pressure produced by the vibration.

Japanese patent application No. 51160 filed in Japan on May 10, 1974 by Hitachi, Ltd. and published after examination as Publication No. 56-007874 on Feb. 20, 1981 discloses a method of manufacturing an ink jet nozzle plate having one or more nozzles or orifices therein. The method comprises growing a high resistance silicon single crystal layer on a low resistance silicon single crystal substrate, masking the high resistance silicon crystal with silicon nitride ($Si_3N_4$) having a photo-etched pattern of the conical orifice to be produced, etching the high resistance silicon with a crystal axis-dependent etching solution to form a conical hole therein, oxidizing the surface of the high resistance silicon, and removing the low resistance silicon.

U.S. Pat. No. 4,362,599 to Imaizumi et al discloses a method of preparing a high-voltage, semiconductor device. The semiconductor device is prepared by forming a silicon substrate of one conductor type having a surface of the (100) crystal plane, opening a rectangular window having sides parallel to the (100) crystal axis, etching the interior of the rectangular window with an anisotropic etching solution to form a recess or dent in the silicon substrate, removing the oxide film and growing an epitaxial layer of silicon having a conductor type opposite to that of the substrate over the entire substrate surface, and masking the recess and etching the expitaxial layer with an anisotropic etching solution to flatten the surface of the epitaxial layer. The remainder of the semiconductor device is produced on the flattened expitaxial layer.

U.S. Pat. No. 4,106,976 to Chiou et at discloses a method of fabricating a nozzle array structure comprising the steps of forming a uniformed layer of inorganic membrane material, such as silicon dioxide or silicon nitride, on the planar surface of a monocrystalline substrate, such as silicon, preferential etching the substrate from the surface opposite the one with the membrane to form an array of openings therethrough, and etching the membrane to form orifices coaxially with the substrate openings. The substrate surfaces are parallel and oriented in the (100) crystallographic direction.

U.S. Pat. No. 4,157,935 to Solyst discloses a method of producing nozzle arrays for ink jet printers from silicon wafers that do not have parallel surfaces. The method comprises exposing the wafer to a light source through a mask, wherein columnar light from the light source is directed toward the wafer at a predetermined angle with respect to the wafer structure and relative motion between the light source and the wafer is produced; treating the wafer to render it subject to anisotropic etching only in the non-exposed areas; and anisotropically etching the wafer to produce uniform orifices corresponding to the mask.

IBM Technical Disclosure Bulletin, Vol. 21, No. 6 dated November 1978 discloses differential etching of mutually perpendicular grooves in opposite surfaces of a (100) oriented silicon wafer. An array of nozzles is formed when the depth of the grooves is equal to one-half of the thickness of the wafer.

An article entitled "Fabrication of Novel Three-Dimensional Microstructures by the Anisotropic Etching of (100) and (110) Silicon" by Ernest Bassous, IEEE Transactions on Electron Devices, Vol. ED-25, No. 10, dated October 1978 discusses the anisotropic etching of single crystal silicon of (100) and (110) orientation and the fabrication of three types of microstructures; viz., (1) a high-precision circular orifice in a thin membrane for use as an ink jet nozzle, (2) a multisocket miniature electrical connector with octohedral cavities suitable for cryogenic applications, and (3) multichannel arrays in (100) and (110) silicon. To make some of these structures, a novel bonding technique to fuse silicon wafers with phosphosilicate glass films was developed. The membrane-type nozzles with circular orifices were fabricated by anisotropic etching of holes in combination with a process which takes advantage of the etch resistance of heavily doped $p^+$ silicon in the etchant.

U.S. Pat. No. 4,438,191 to Cloutier et al discloses a method of making a monolithic bubble-driven ink jet printhead which eliminates the need for using adhesives to construct multiple part assemblies. The method provides a layered structure which can be manufactured by standard integrated circuit and printed circuit processing techniques. Basically, the substrate with the bubble generating resistors and individually addressing electrodes have the ink chambers and nozzles internally formed thereon by standard semiconductor processing.

SUMMARY OF THE INVENTION

It is an object of the present invention to provide an ink filtering system for an ink jet printhead offering maximum effectiveness by locating the filter in the printhead.

It is another object of this invention not to restrict the ink flow through the printhead by making the total cross-sectional flow area of the filter larger than the total cross-sectional flow area of the printhead nozzles.

It is still another object of this invention to provide a printhead having an integral filter built therein with minimal cost increase.

It is yet another object of this invention to provide a method of batch fabricating channel plates, each having sets of channels with an associated manifold and integral filtering system, the channels being of highly uniform size and shape with a pitch or center-to-center spacing corresponding to a pixel density of up to 1000 spots per inch (spi), and a method of batch fabricating sets of heating elements with addressing electrodes on a plurality of substrates, so that one channel plate and one heating element substrate may be aligned and bonded together to form a plurality of printheads with an integral filters.

It is still a further object of this invention to provide a method of batch fabricating the channel plates on a silicon wafer by first anisotropically etching, then isotropically etching the wafer, followed by a second and final anisotropic etching process.

In the present invention, a plurality of ink jet printheads with integral, internal filters are fabricated from two (100) silicon wafers. In the preferred embodiment, as in commonly assigned and copending U.S. application Ser. No. 719,410 filed Apr. 3, 1985 now U.S. Pat. No. 4,601,777 to Hawkins et al, the printheads are of the thermal, drop-on-demand type and adapted for carriage printing. A plurality of sets of heating elements and their individually addressing electrodes are formed on a surface of one of the wafers, and a corresponding plurality of sets of parallel channels, each channel set communicating with a recessed manifold having a particle filter therein, are anisotropically and isotropically etched in a surface of the other wafer. A fill hole and alignment openings are etched in the other surface of the wafer with the channels. Alignment marks are formed at predetermined locations on the wafer surface having the heating elements. The wafer surface with the channels are aligned with the heating elements via the alignment openings and alignment marks and bonded together. A plurality of individual printheads are obtained by dicing the two bonded wafers. With exception of the integral particle filter, the printhead and process for making it are the same as that in U.S. Ser. No. 719,410 mentioned above. Each printhead is fixedly positioned on one edge of an L-shaped electrode or daughter board with the manifold fill hole exposed, so that the channel nozzles are parallel to the daughter board edge. The printhead electrodes are wire-bonded to corresponding electrodes on the daughter board. The daughter board with printhead is mounted on an ink supply cartridge. The ink cartridge may optionally be disposable. The printhead fill·hole is sealingly positioned over and coincident with an aperture in the cartridge in order that ink may fill and be maintained in the printhead manifold and their associated capillary-filled ink channels.

The printhead, daughter board, and cartridge combination may, for example, be mounted on a carriage of an ink jet printer that is adapted for reciprocation across the surface of a recording medium, such as paper. The paper is stepped a predetermined distance each time the printhead's reciprocating direction is reversed to print another line. The array of printhead nozzles in this configuration are parallel to the direction of movement of the recording medium and perpendicular to the direction of traversal of the carriage. Current pulses are selectively applied to the heating elements in each channel from a controller in the printer in response to receipt of digitized data signals by the controller. In a pagewidth array configuration, of course, the array is fixed and oriented perpendicular to the direction of movement of the recording medium, and during the printing operation, the recording medium continually moves at a constant velocity.

The current pulses cause the heating elements to transfer thermal energy to the ink which, as is well known in the art, vaporizes the ink and momentarily produces a bubble. The heating element cools after the passage of the current and the bubble collapses. The nucleation and expansion of the bubble forms an ink droplet and propels it towards the recording medium.

In such an ink jet printer as described above, very small nozzles having flow areas on the order of 1 to 4 square mils (625 to 2500 square microns) are required to produce small ink droplets for printing. This necessitates the use of a fine filtration system to prevent contaminating particles from clogging the printhead nozzles. For maximum effectiveness, the filtration should occur close to the nozzles and yet not restrict ink flow. The present invention accomplishes these objectives by integrally building the filtration system into the printhead itself with minimal additional fabricating cost impact for the printhead, because a filter is integrally fabricated in the printhead without additional process steps.

Figure 7:
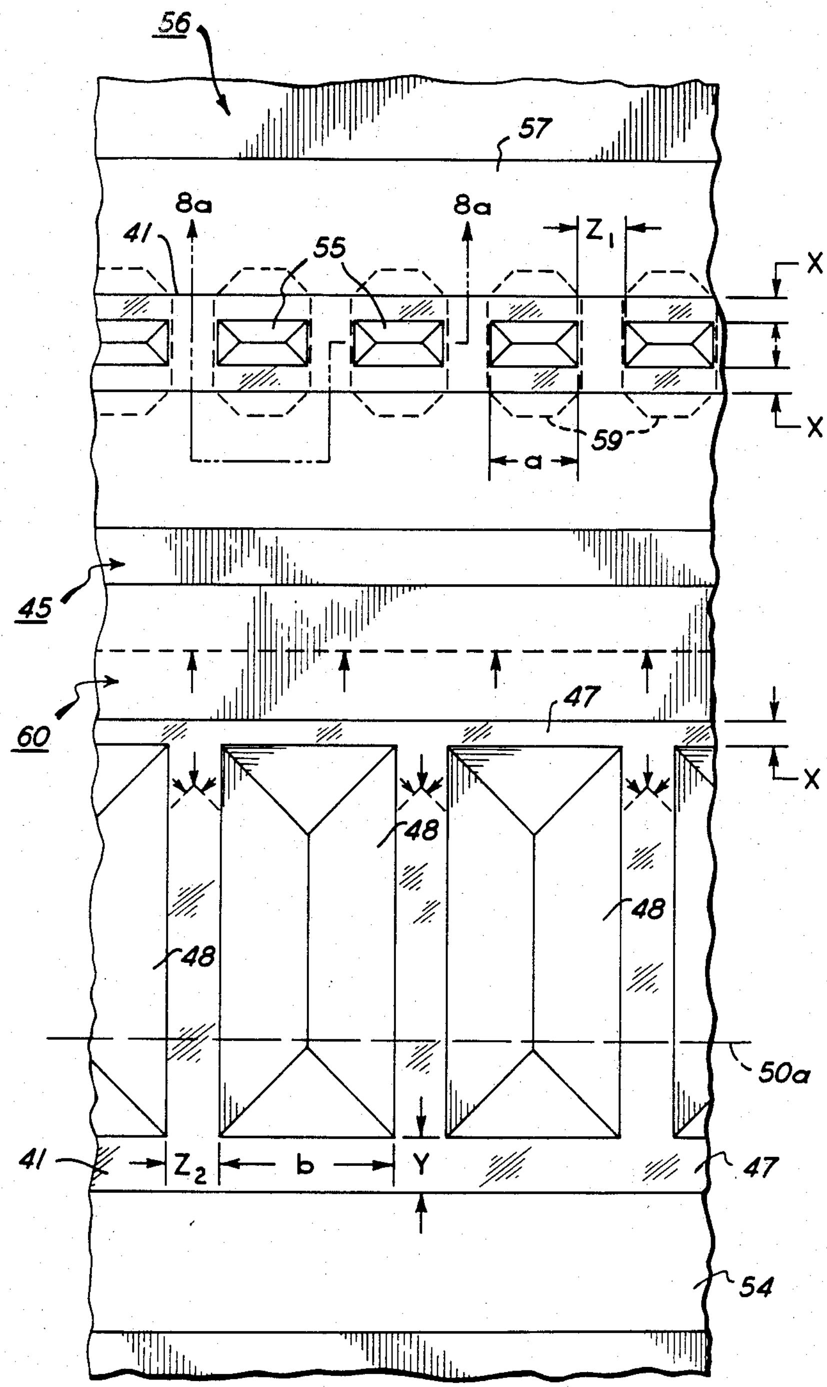
FIG. 7 is an enlarged partial plan view of the channel and filtration recesses anisotropically etched with subsequent isotropic etching shown in dashed line.

FIG. **8*a* is a partial cross-sectional view of the filtration wall shown in FIG. 7, as viewed along the line "8*a*—8*a*.**"

Figure 6:
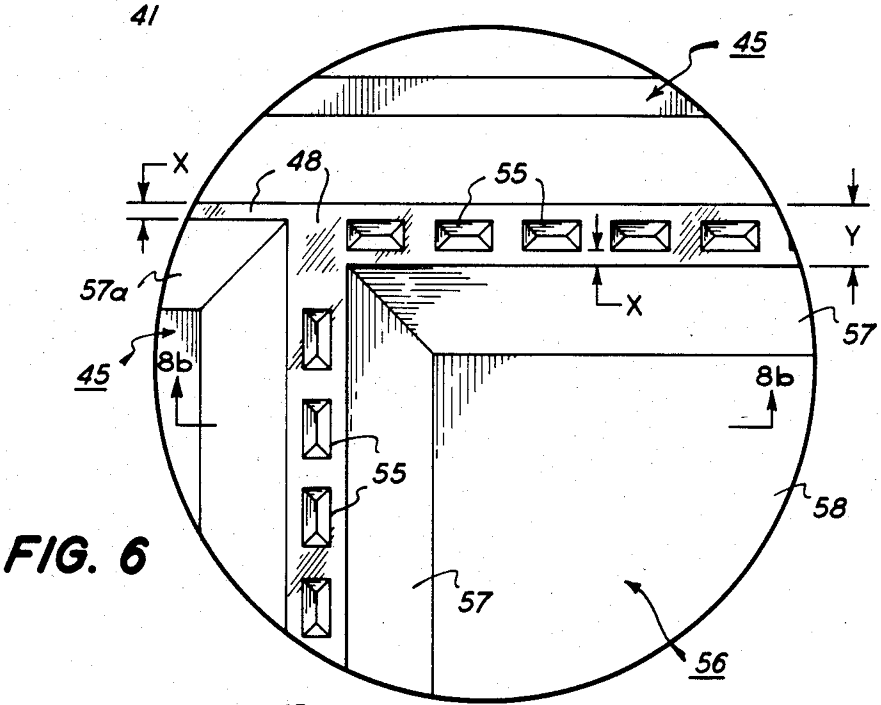
FIG. 6 is a further enlargement of that portion of the wafer shown in FIG. 4 that is encircled and identified as "6—6."

FIG. **8*b* is a partial cross-sectional view of the filtration wall shown in FIG. 6, as viewed along the line 8*b*—8*b*,** showing the isotropically etched undercut of the protective, nitride masking layer.

Figure 4:
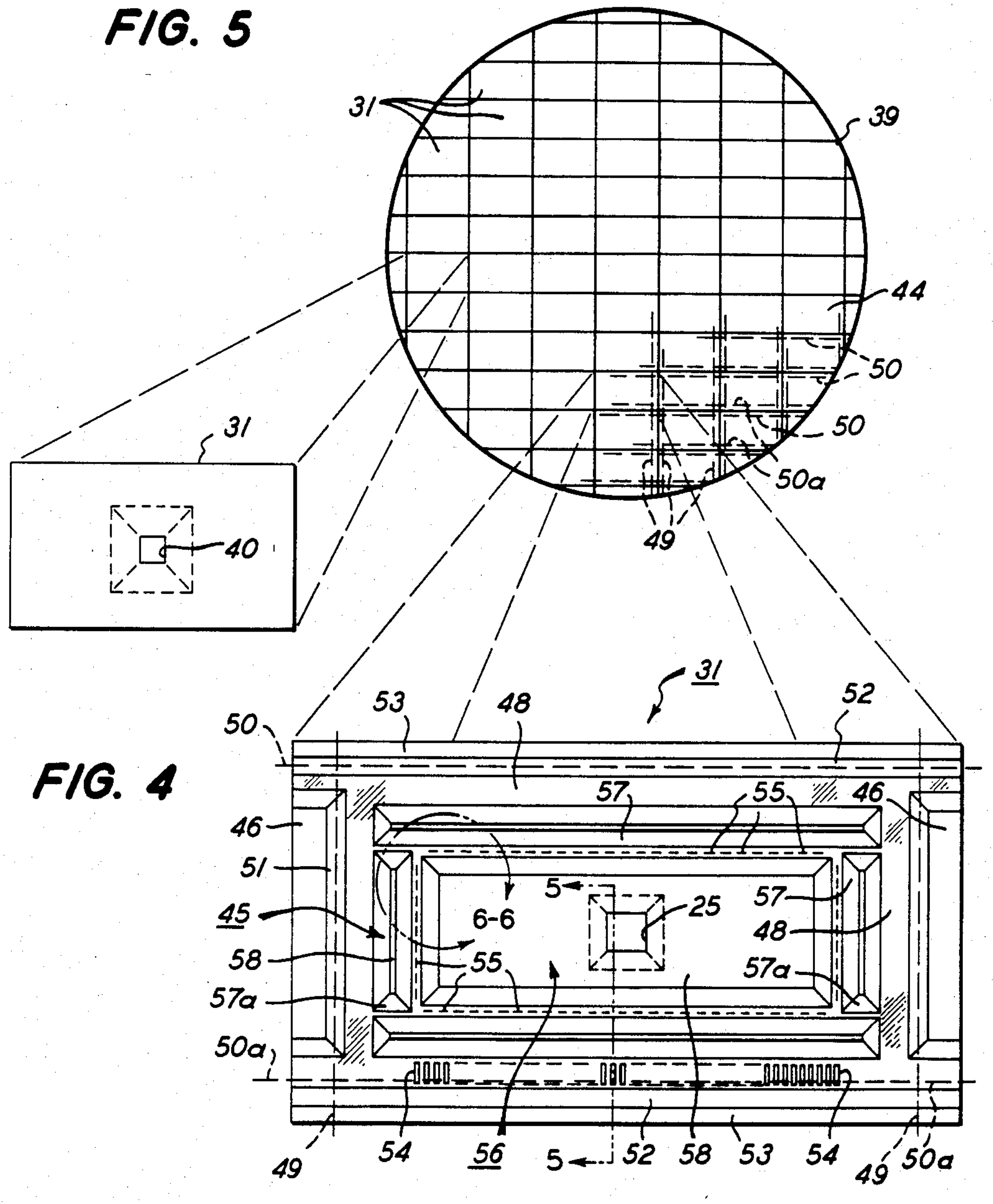
FIG. 4 is a schematic plan view of a wafer having a plurality of ink manifold recesses, each manifold having an array of channels and a filtration wall in the manifold all concurrently anisotropically etched therein, one enlarged manifold recess with its filtration wall and associated array of channels being shown, as well as one enlarged alignment opening.

FIG. 9 is an enlarged plan view of an alternate embodiment of the enlarged wafer portion shown in FIG. 4.

FIG. 10 shows an enlarged isometric view of the channel and manifold wafer bonded to the wafer with the heating elements, after unwanted channel wafer material has been removed to expose the printhead electrode terminals prior to separation of the wafers into a plurality of individual printheads.

Figure 2:
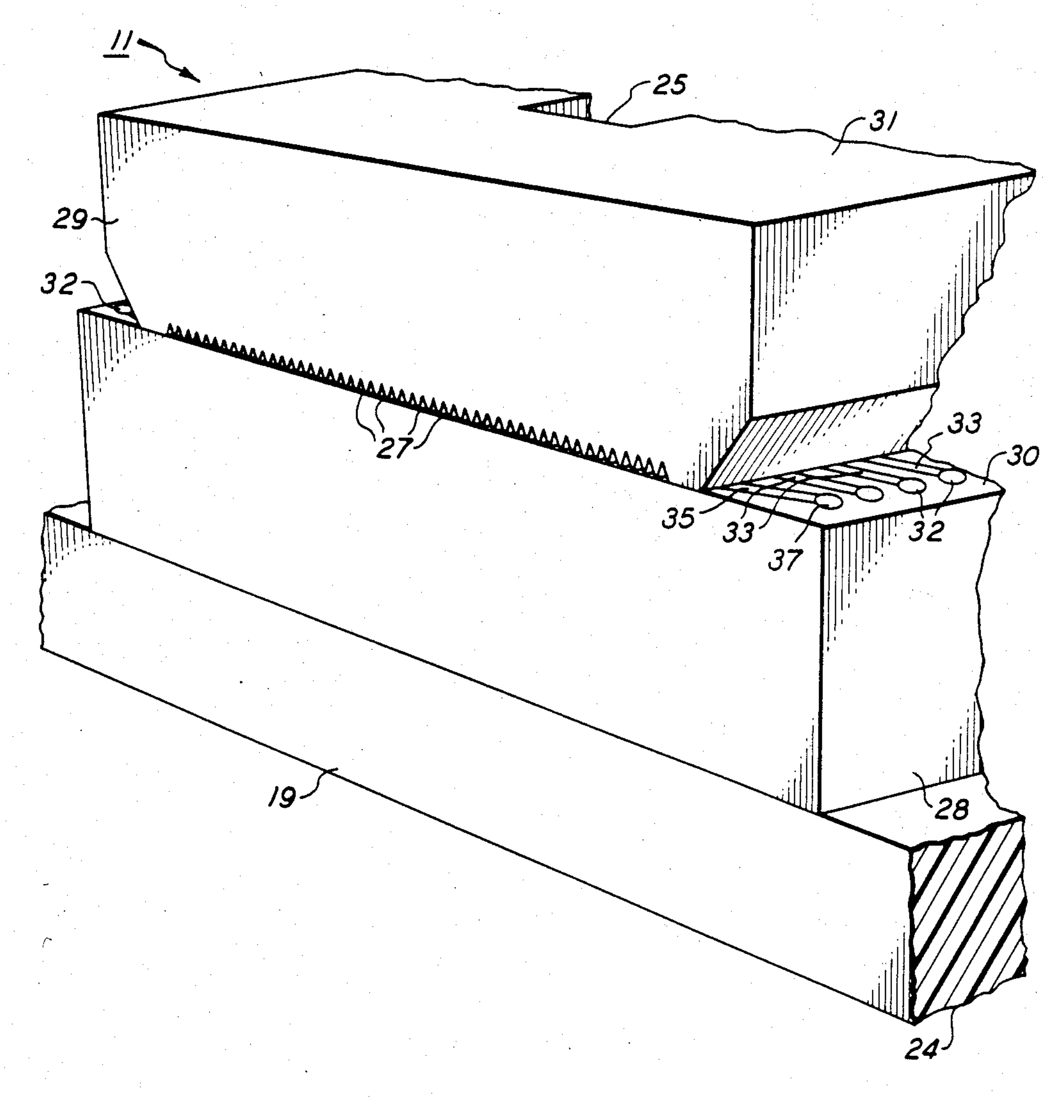
FIG. 2 is a partially shown, enlarged isometric view of the printhead mounted on a daughter board and showing the ink droplet emitting nozzles.
Figure 11:
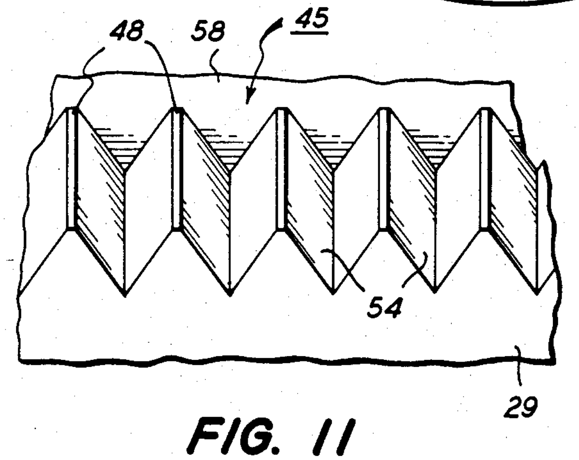

FIG. 11 is a partial isometric view of an etched set of channels of the printhead of FIG. 2, with the printhead portion having the heating elements removed to better show the channels after they have been milled open to form the nozzles.

DESCRIPTION OF THE PREFERRED EMBODIMENT

Figure 1:
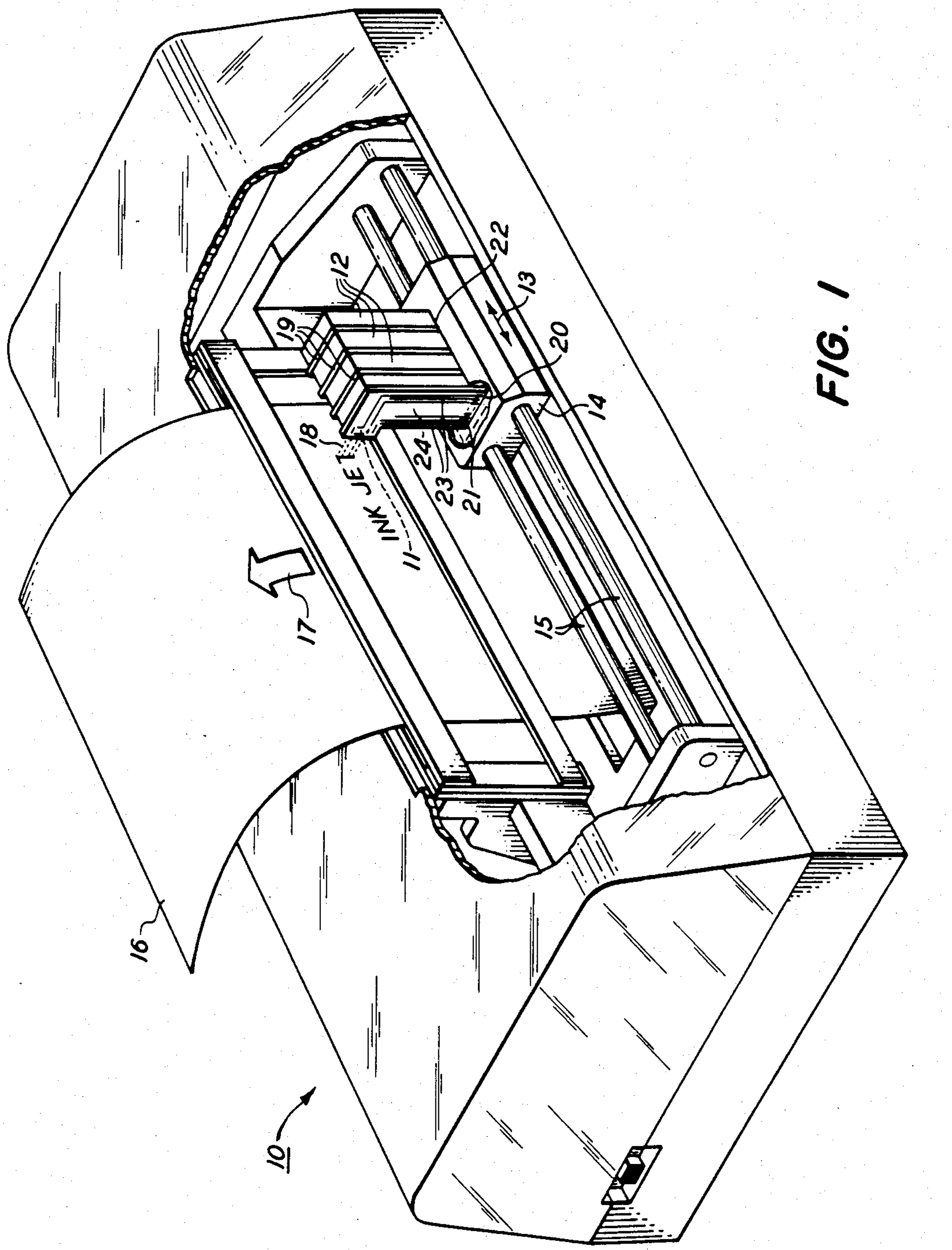
FIG. 1 is a schematic isometric view of a carriage-type, thermal ink jet printing system incorporating the present invention.

A typical carriage-type, multicolor, thermal ink jet printing device 10 is shown in FIG. 1. A linear array of ink droplet producing channels is housed in each printhead 11 of each ink supply cartridge 12 which may optionally be disposable. One or more ink supply cartridges are replaceably mounted on a reciprocating carriage assembly 14 which reciprocates back and forth in the direction of arrow 13 on guide rails 15. The channels terminate with orifices or nozzles aligned perpendicular to the carriage reciprocating direction and parallel to the stepping direction of the recording medium 16, such as paper. Thus, the printhead prints a swath of information on the stationary recording medium as it moves in one direction. Prior to the carriage and printhead reversing direction, the recording medium is stepped by the printing device a distance equal to the printed swath in the direction of arrow 17 and then the printhead moves in the opposite direction printing another swath of information. Droplets 18 are expelled and propelled to the recording medium from the nozzles in response to digital data signals received by the printing device controller (not shown), which, in turn, selectively addresses the individual heating elements, located in the printhead channels a predetermined distance from the nozzles, with a current pulse. The current pulses passing through the printhead heating elements vaporize the ink contacting the heating elements and produces temporary vapor bubbles to expel droplets of ink from the nozzles. Alternatively, several printheads may be accurately juxtapositioned to form a pagewidth array of nozzles. In this configuration (not shown), the nozzles are stationary and the paper moves therepast.

In FIG. 1, several ink supply cartridges 12 and fixedly mounted electrode boards or daughter boards 19 are shown in which each sandwich therebetween a printhead 11, shown in dashed line. The printhead is permanently attached to the daughter board and their respective electrodes are wire-bonded together. A printhead fill hole, discussed more fully later, is sealingly positioned against and coincident with an aperture (not shown) in the cartridge, so that ink from the cartridge is continuously supplied to the ink channels via the manifold during operation of the printing device. This cartridge is similar to and more fully described in U.S. application Ser. No. 677,426 filed Dec. 3, 1984 now U.S. Pat. No. 4,571,599 by Ivan Rezanka and assigned to the same assignee as this application. Note that the lower portion 20 of each daughter board 19 has electrode terminals 21 which extend below the cartridge bottom 22 to facilitate plugging into a female receptacle (not shown) in the carriage assembly 14. In the preferred embodiment, the printhead contains at least 48 channels on about 3 mil (75 micron) centers for printing with a resolution of around 300 spots per inch (spi). Such a high density of addressing electrodes 23 on each daughter board is more conveniently handled by having some of the electrodes terminate on both sides. In FIG. 1, the side 24 shown is opposite the one containing the printhead. The electrodes all originate on the side with the printhead, but some pass through the daughter board. All of the electrodes 23 terminate at daughter board end 20.

FIG. 2 is an enlarged schematic isometric view of the front face of the printhead 11, showing printhead mounted on the daughter board 19 and showing the array of droplet emitting nozzles 27. The lower, electrically insulated substrate 28 has the heating elements (not shown) and addressing electrodes 33 patterned on the surface 30 thereof, while the upper substrate 31 has parallel grooves, with triangular, cross-sectional areas, which extend in one direction and penetrate through the upper substrate front edge 29. The other end of the grooves communicate with a common internal recess, not shown in this Figure. The floor of the internal recess has an opening therethrough for use as an ink fill hole 25. The surface of the upper substrate with the grooves are aligned and bonded to the lower substrate 28, as described later, so that a respective one of the plurality of heating elements is positioned in each channel, formed by the grooves and the lower substrate. Ink enters the manifold formed by the recess and the lower substrate through the fill hole and, by capillary action, fills the channels. The ink at each nozzle forms a meniscus, the surface tension of which prevents the ink from weeping therefrom. The addressing electrodes 33 on the lower substrate 28 terminate at terminals 32. The upper substrate or channel plate 31 is smaller than that of the lower substrate or heating element plate 28 in order that the electrode terminals 32 are exposed and available for wire-bonding to the electrodes of the daughter boards, on which this printhead 11 is permanently mounted.

Figure 3:
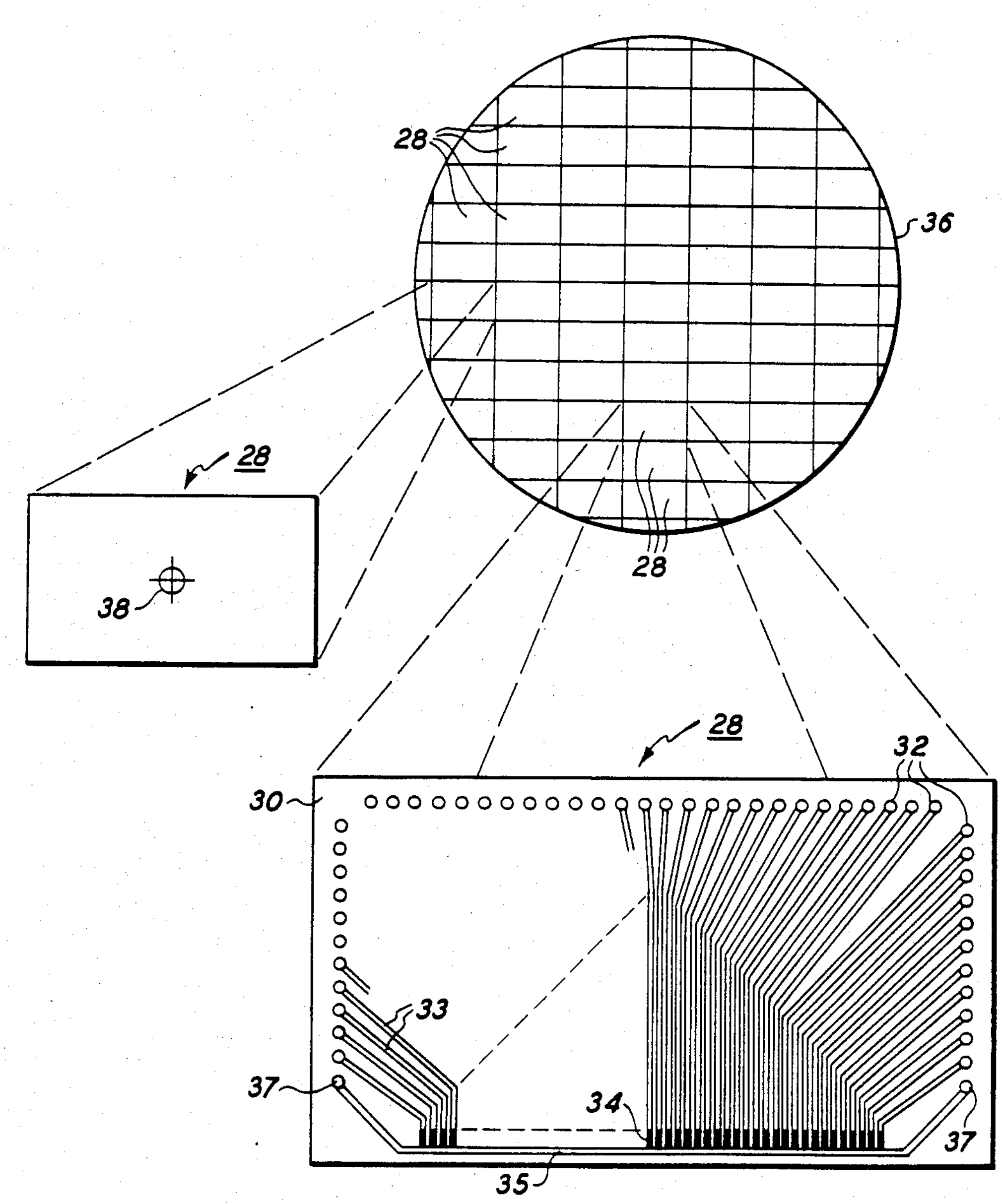
FIG. 3 is a schematic plan view of a wafer having a plurality of heating element arrays and associated addressing electrodes, with one heating element array and one alignment mark being shown enlarged.

In FIG. 3, a plurality of sets of bubble-generating, heating elements 34 and their addressing electrodes 33 are patterned on the polished surface of a single-side-polished, (100) silicon wafer 36. Shown enlarged is one set of heating elements 34 and addressing electrodes 33 formed on a portion of wafer 36, called lower substrate or heating element plate 28, that is suitable for one ink jet printhead. Prior to patterning the multiple sets of printhead electrodes 33, the resistive material that serves as the heating elements, and the common return 35, the polished surface to receive the heating elements and addressing electrodes is coated with an underglaze layer (not shown), such as $SiO_2$, having a thickness of between 5000 Å and one micron. The resistive material may be a doped polycrystalline silicon which may be deposited by chemical vapor deposition (CVD) or may be any other well known resistive material such as $ZrB_2$.

In the preferred embodiment, polysilicon heating elements are used and a $SiO_2$ thermal oxide layer (not shown) is grown from the polysilicon in high temperature steam. The thermal oxide layer is typically grown to a thickness of 0.5 to 1.0 micron to protect and insulate the heating elements from the conductive ink. The thermal oxide is removed at the edges of the polysilicon heating elements for attachment of the addressing electrodes and common return, which are then patterned and deposited. If a resistive material such as $ZrB_2$ is used fo the heating elements, then other suitable well known insulative materials may be used for the protective layer thereover.

The common return and the addressing electrodes are aluminum leads deposited on the underglaze layer and over the edges of the heating elements. The common return ends 37 and addressing electrodes terminals 32 are positioned at predetermined locations to allow clearance for wire-bonding to the daughter board electrodes 23 after the channel plate 31 (see FIG. 10) is attached to make the printhead. The common return 35 and the addressing electrodes 33 are deposited to a thickness of 0.5 to 3.0 microns, with the preferred thickness being 1.5 microns.

Before electrode passivation, a tantalum (Ta) layer (not shown) may be optionally deposited to a thickness of about 1 micron on the heating element protective layer (e.g., the thermal oxide layer) for added protection thereof against the cavitational forces generated by the collapsing ink vapor bubbles during printhead operation. The Ta layer is etched off all but the protective layer directly over the heating elements using, for example, $Cf_4/O_2$ plasma etching.

For electrode passivation, a 2 micron thick phosphorous doped CVD $SiO_2$ film (not shown) is deposited over the entire wafer surface, including the plurality of sets of heating elements and addressing electrodes and subsequently etched off of the heating elements or Ta layer as well as the terminal ends of the common return and addressing electrodes for subsequent connection with the daughter board electrodes by wire-bonding. This etching may be either the wet or dry etching method. Alternatively, the electrode passivation may be accomplished by plasma deposited $Si_3N_4$.

At a convenient point after the underglaze is deposited, at least, two alignment markings 38 are photolithographically produced at predetermined locations on separate lower substrates 28, which substrates make up wafer 36. These alignment markings are used for alignment of the plurality of channel plates or upper substrates 31, which make up wafer 39, with the sets of heating elements being on wafer 28. The surface of the single-sided wafer 36 containing the plurality of sets of the heating elements and addressing electrodes are bonded to the wafer 39, after alignment between the wafers, as explained later.

In FIG. 4, a two-side-polished, (100) silicon wafer 39 is used to produce the plurality of upper substrates 31 for the printhead. After the wafer is chemically cleaned, a masking layer such as, for example, a pyrolytic CVD silicon nitride layer 41 (see FIG. 5) is deposited on both sides. Using conventional photolithography, a via for fill hole 25 for each of the plurality of upper substrates 31 and, at least two vias for alignment openings 40 at predetermined locations are printed on one wafer side 42, opposite the side shown in FIG. 4. The silicon nitride is plasma etched off of the patterned vias representing the fill holes and alignment openings. A potassium hydroxide (KOH) anisotropic etch is used to etch the fill holes and alignment openings. In this case, the (111) planes of the (100) wafer make an angle of 54.7 degrees with the surface of the wafer. The fill holes are small square surface patterns of about 20 mils (0.5 mm) per side, and the alignment openings are about 60 to 80 mils square (1.5 to 2.0 mm square). Thus, the alignment openings are etched entirely through the 1 mm thick wafer, while the fill holes are etched to a terminating apex at about half way to three quarters through the wafer. The relatively small square fill hole is invariant to further size increase with continued etching, so that etching of the alignment openings and fill holes are not significantly time constrained. This etching takes about two hours and many wafers can be simultaneously processed.

Next, the opposite side 44 of wafer 39 is photolithographically patterned, using the previously etched alignment holes as a reference, to form vias in the silicon nitride layer for anisotropically etching a plurality of sets of recesses. The relatively large rectangular recess 45 in each channel plate making up wafer 39 will eventually become the ink manifolds of the printheads. Inside the manifold recess 45, narrow wall patterns are formed with small, substantially rectangular or square openings 55 in the top surfaces thereof. These internal wall patterns will produce an internal chamber 56 inside each of the manifold recess and contains the fill hole 25. As will be explained later, the ink will be filtered as it moves from the internal chamber to the manifold. Also patterned are two spacing recesses 46 between the manifolds in each substrate 31 and adjacent each of the shorter walls 51 of the manifold recesses. Parallel elongated grooves 53, parallel and adjacent each longer manifold recess wall 52, extend entirely across the wafer surface 44 and between the manifold recesses 45 of adjacent substrates 31. The elongated grooves do not extend through the edge of the wafer, however, for reasons explained later. In one of the manifold recess walls 52, a pattern of 48 or more parallel, narrow vias in the silicon nitride layer 41 are formed which, upon etching, will form the set of channel grooves 54 that will eventually serve as the printhead channels to emit ink droplets.

The lands 48 or tops of the walls delineating the manifold and internal chamber recesses are portions of the original wafer surface 44 that still contain the silicon nitride layer 41. These lands form the streets on which adhesive will be applied later for bonding the two wafers 36, 39 together. In the preferred embodiment the silicon nitride layer 41 is removed prior to the application of the adhesive. The elongated grooves 53 and recesses 46 provide clearance for the printhead electrode terminals during the bonding process, discussed later.

Dashed lines 49, 50, and 50*a* indicate the milling or dicing boundaries for removal of unused wafer material, discussed later with reference to FIG. 10. Dashed lines 49 are parallel to the channels 54 and dashed lines 50 and 50*a* are perpendicular to the dashed lines 49. The dicing along dashed line 50*a* opens the channels and forms the nozzles 27. This nozzle opening is preferably performed when the two bonded wafers are cut into individual printheads.

As shown in FIG. 4, an anisotropic etchant, such as potassium hydroxide (KOH), is used to concurrently etch the manifold recess 45, internal chamber 56, channel grooves 54, spacing recesses 46 and 53, as well as the pits 55 in the top of the walls 57 defining the internal chamber 56. Because of the size of the vias forming the manifold and internal chamber recesses, the etching process must be timed to stop the depth of the recesses. Otherwise, the pattern size is so large that the etchant would etch entirely through the wafer. The floor 58 of both the manifold recess and its internal chamber 56 is determined at a depth where the etching process is stopped. This floor 58 is low enough to meet and slightly surpass the depth of the fill hole recess, so that an opening 25 is produced, which is suitable for use as the ink fill hole. As disclosed in U.S. application Ser. No. 719,410 to Hawkins et al, mentioned earlier, the channels could be produced by dicing wall 52 instead of by etching and/or the fill hole 25 and alignment openings 40 could be anisotropically etched concurrently with the manifold recess and other recesses, all from one side of a single side polished wafer. Accordingly, the subject matter of U.S. application Ser. No. 719,410 is incorporated herein by reference.

Anisotropic etching of (100) silicon wafers must always be conducted through square or rectangular vias, so that the etching is along the (111) planes. Thus, each recess or opening has walls at 54.7 degrees with the surface of the wafer that converge towards each other. If the square or rectangular opening is small with respect to the wafer thickness a recess is formed. For example, a small etched rectangular surface shape will produce an elongated, V-grooved recess with all walls at 54.7 degrees with the wafer surface, while a small square surface will produce an inverted pryamidal-shaped recess having an apex. As is well known in the art, only internal corners may be anisotropically etched. External or convex corners do not have (111) planes to guide the etching and the etchant etches away such corners very rapidly. This is why the channel recesses 54, and internal chambers 56 cannot be opened at their ends or have external corners, but instead must be completed by a separate process step.

Figure 5:
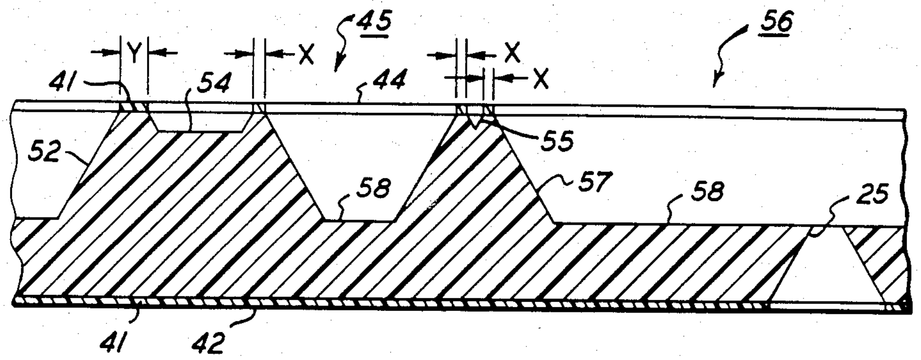
FIG. 5 is an enlarged cross-sectional view, of the enlarged portion of the wafer shown in FIG. 4, as viewed along the line "5—5" thereof, showing the channel wall and filtration wall.

FIG. 5 is a cross-sectional view taken along line "5—5" of the enlarged view of channel plate 31 in FIG. 4. Since the anisotropic etching depth depends upon the surface area of the wafer exposed to the etchant, the channel recess 54 and pit 55 in the internal chamber wall 57 converge along the (111) planes and stop, while the etching of the larger surface areas for the mainfold recess 45 and internal chamber recess 56 continue to etch until the (111) planes of the recesses converge, etch through the wafer, or the etching process is timely stopped. In the preferred embodiment, the etching process is stopped when the coplanar floors 58 of the manifold and internal chamber recesses reach a depth that enable them to meet the recess for the fill hole 25.

An enlarged plan view of that portion of the walls 57 of the internal chamber indicated by the circled area "6—6" in FIG. 4 is shown in FIG. 6. The extension of wall 57*a* that connects to wall 51 of the manifold recess has a thickness as "X" that is substantially the same as the thickness between the pit 55 and the outer surfaces of the internal chamber wall 57, for reasons discussed below.

Figure 8B:
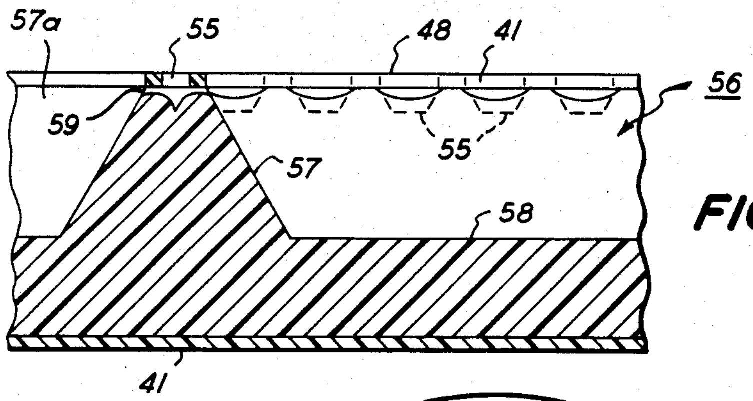
Figure 8A:
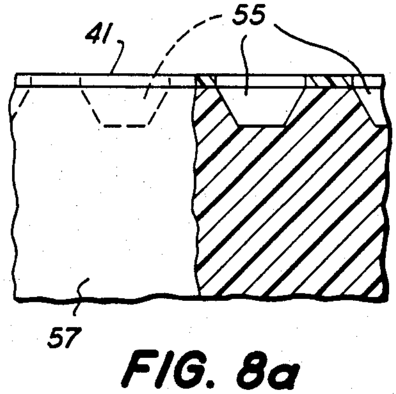

The channel recesses 54 and the internal chamber 56 may be opened to the manifold recess 45 by an isotropic etch of a short predetermined duration, such as two minutes, to undercut the thin nitride mask 41, followed by a short KOH anisotropic etch, for example, for five minutes to complete the openings of the channel recesses and the internal chamber to the manifold recess. Since isotropic etching etches equally in all directions at the same time, this removal of silicon must be taken into account when the anisotropic etching is designed as discussed in copending application Ser. No. 719,410 referenced earlier by the same inventors and assignee. Because the channels and internal chamber have been isotropically then anisotropically etched opened, the channel walls have been shortened but are still within the desired length of an 20 mils (0.5 mm). Viewed along line "8*b*—8*b*" of FIG. 6, the isotropic etching undercuts at the pits 55 are depicted in FIG. 8*b*. FIG. 8*a* shows the pits 55 before the undercutting of the nitride mask 41 by the isotropic etching step. This view is taken along line "8*a*—8*a*" of FIG. 7. In FIG. 8*a*, the internal chamber wall 57 is solid to the nitirde layer 41. Because of the thickness of the wall indicated by the distance "Y" is much larger than the thickness of the distance "X" between each side of the pit 55 to the exterior surfaces of the internal chamber wall 57, the nitride layer 41 is undercut entirely across the internal chamber wall only at the pits and not elsewhere in chamber wall 57. Refer to FIGS. 5 to 7. Since the wall extensions 57*a* are about the same thickness as that between the pit 55 and exterior surfaces of internal chamber wall 57, it too is completely undercut, so that the subsequent anisotropic etching clears this wall extension 57*a* and leaves the internal chamber totally surrounded by the manifold recess.

As well-known isotropic etch is, for example, mixtures of $HF/HNO_3/C_2H_4O_2$. Such an etchant removes silicon from the surface contacting it equally in all directions and, thus, the silicon nitride layer 41 forming the mask for the anisotropic etching is undercut at the interior end of the channel (i.e. the end adjacent the manifold recess indicated by distance "X"), since it is purposely made more narrow than the other end indicated by the longer distance "Y"; refer to FIGS. 5 and 7.

A partially shown enlarged plan view of the channel plate 31 is depicted in FIG. 7 after the anisotropic etching and with the isotropic and second anisotropic etching schematically shown in dashed line. Though the isotropic etchant attacks all surface areas, only the regions involving the interior sidewalls of the channel recesses 54 and the pits 55 are shown. The silicon nitride layer 41, which forms the mask for the anisotropic etching and may serve as the streets or lands 48 for the application of the adhesive, is very narrow at the channel recess ends which are adjacent the manifold recess 45. This distance is shown as "X" distance, generally in the range of 0.2 to 1.0 mil (5 to 25 microns). At the other end, which will ultimately be the nozzles, the distance "Y" is at least twice that of the "X" distance. Thus, while the isotropic etching removes and undercuts the silicon nitride layer at the channel interior ends, it cannot do so at the other wider end. Having anticipated the enlargement and shortening of the channels by using the technique of opening the channels to the manifold by isotropic then anisotropic etching, the use of some other process, such as dicing, to open the interior channel ends to the manifold is avoided. This same approach is concurrently used to open passageways between the internal chamber recess 56 and the manifold recess 45. Since the distance from the pit through the internal chamber wall 57 is also only the distance "X," while the thickness of the wall 57 is the distance "Y," passageways 59 (shown in dahsed line) are formed at each pit 55. Also, refer to FIG. **8*b* to see the passageways between the internal chamber recess 56 and the manifold recess 45. In the preferred embodiment, as mentioned earlier, the nitride layer 41 is removed prior to applying the adhesive to the lands 48**.

As seen in FIG. 7, each side of the pit 55, represented by the distance "a," is much smaller than the width of the channel recesses 54, represented by the distance "b", where "b" is always about twice the dimension of "a." The distance between pits is $Z_1$ and the distance between channels is $Z_2$. $Z_1$ is about equal to $Z_2$ and where both are about 1 mil (25 microns). The distance $Z_1$ and $Z_2$ are about equal to the distance "Y" or about twice the ditance "X." The silicon nitride layer 41 on wafer side 44 may form the bonding surfaces, though not in the preferred embodiment where the nitride layer is removed, and a coating of an adhesive, such as a thermo-setting epoxy, is applied to the bonding surfaces in a manner such that it does not run or spread into the grooves 54 or other recesses. The alignment openings 40 are used, for example, with a vacuum chuck mask aligner to align the channel wafer 39 via the alignment marks 38 on the heating element and addressing electrode wafer 36. The two wafers are accurately mated and tacked togther by partial curing of the adhesive. Alternatively, the heating element and channel wafers 36, 39 can be given precisely diced edges and then manually or automatically aligned in a precision jig. The grooves 54 automatically are positioned by either alignment operation, so that each one has a heating element therein located a predetermined distance from the nozzles or orifices in channel plate edge 29 (see FIG. 2). The two wafers are cured in an oven or a laminator to permanently bond them together and then the channel wafer is milled to produce individual upper substrates 31 with the manifolds and ink channels on the heater plate wafer 36 as shown in FIG. 10. Care is taken not to machine the exposed printhead electrodes terminals 32 which surround the three sides of the manifold that do not have the nozzles. The recesses 46 and elongated grooves 53 greatly assist in preventing damage to the printhead electrodes 33 and terminals 32 and 37 by spacing the upper substrate therefrom.

The heating element wafer 36 is then diced to produce a plurality of individual printheads which are bonded to the daughter board and the printhead electrode terminals are wire bonded to the daughter board electrodes. The cut on the exterior side of the channels is done during the step of dicing out the individual printheads. Thus, the channels are opened at this time and the nozzles 27 are formed in the perpendicular upper substrate face 29 of the channel plate 31, as shown in FIGS. 2 and 11. FIG. 11 is shown with the heating element plate 28 removed to better show the v-groove ink channels 54.

An alternate embodiment is shown in FIG. 9, where like components have like index numerals. The wall 57 forming the internal chamber recess 56 is shown having a serpentine design to increase greatly the perimeter of the internal chamber and, thus, to increase greatly the number of passageways 59 between the internal chamber and the surrounding manifold 45, because of the increase in the number of pits 55. The size of each of passageways 59 (not shown) are always smaller than each of the channels 54, but the total amount of cross-sectional ink flow area of the passageways must be larger than that of the total amount of cross-sectional ink flow area of the ink channels for proper operation of the printhead. Otherwise, ink replenishment would be impeded, especially if a large number of nozzles were firing or emitting droplets concurrently. Some of the wall extensions **57*a***, which have been etched away by first the isotropic etching to undercut the nitride layer and then the anisotropic etching step to substantially completely remove it, have been shown in dashed line to show the channel as it looks after the initial anisotropic etching step.

Such configurations for printheads, as discussed above, provide a filtering system that is very close to the nozzles and that is an integral part of the printhead. No special housing or sealing is required for the filtering system and, indeed, the cost of the filter fabrication added to the cost of normal printhead fabrication is negligible, since the same process that produces anisotropically-isotropically etched ink bearing channels and manifolds also produces the filter. The only extra effort required is that of including the filter structure in the manifold and channel mask. In addition, many filter containing channel plates can be made in a single silicon wafer; at least 180 channel plates 31 per wafer. Batches of 25 wafers can be simultaneously processed, so that 4500 upper substrates or channel plates may be produced per batch.

In recapitulation, a plurality of printheads with internal filtering systems are produced for substantially no increase in cost by incorporating an internal chamber in each manifold having a plurality of passageways that are always smaller in cross-sectional area than the capillary filled, ink channels that have the droplet emitting nozzles on one end. Therefore, any contaminating particle in the ink that would not have been passed by the channels will be previously filtered or stopped by the passageways communicating between the internal chamber an the surrounding manifold. This is because the ink flows first into the internal chamber then through passageways to the manifold, and lastly into the channels and, more importantly, because the passageways are always smaller than the channels. A few clogged passageways will not impact the quality of ink jet printing, but a clogged printhead channel definitely will.

Many modifications and variations are apparent from the foregoing description of the invention and all such modifications and variations are intended to be within the scope of the present invention.

What is claimed is:

1. An ink jet printhead comprising:

first and second substrates;

one surface of the first substrate containing a linear array of heating elements and each heating element having individual addressing electrodes, the heating elements and addressing electrodes being coated with a passivation layer;

one surface of the second substrate containing a pattern of recesses, including a linear array of parallel channel recesses opening on one end through an edge of the second substrate and the other ends communicating with a common manifold recess, an internal chamber recess being provided by an enclosing wall inside of and surrounded by the manifold recess, a plurality of passageway recesses being formed perpendicularly through the chamber walls to provide communication between the internal chamber and the manifold;

a fill hole being provided through the second substrate, one end of the fill hole entering the internal chamber recess;

the surface of the first substrate having the heating elements and addressing electrodes being aligned with and bonded against the surface of the second substrate having the recesses, so that each channel has one of the heating elements therein spaced a predetermined distance from the channel open ends that serve as droplet emitting nozzles;

means for providing ink at a predetermined pressure to the fill hole, so that ink travels through the fill hole to the internal chamber, through the passageways to the manifold, and from the manifold to fill the channels and form a meniscus at each nozzle;

the ink being filtered as it flows through the passageways because the cross-sectional flow areas of each of the passageways are smaller than each of the cross-sectional flow areas of the channels while the total flow area of the passageways is greater than the total flow area of the channels; and means for selectively placing a current pulse representing digitized data signals on the addressing electrodes to temporarily vaporize the ink contacting the passivated heating elements and produce bubbles which expel droplets of ink from the nozzles of the selectively pulsed heating elements.

2. The ink jet printhead of claim 1 wherein the enclosing wall with the filtering passageways, which provides the internal chamber, has a serpentine design to increase the perimeter of the internal chamber and thus to increase the number of filtering passageways, so that the ink replenishment is not impeded, even if a large number of nozzles emit droplets concurrently, or if some of the filtering passageways are clogged.

3. A method for fabricating a thermal ink jet printhead with a monolithic particle filter, the printhead having a plurality of ink channels which have a nozzle on one end and an inlet communicating with an ink containing manifold at the other end, the particle filter being in close proximity to the channel inlet, the method comprising the steps of:

(a) photolithographically patterning a masking layer on a first (100) silicon substrate to produce a plurality of vias therein with predetermined shapes;

(b) etching at least the manifold and the monolithic particle filter simultaneously in the manifold by successive anisotropic, isotropic and anisotropic etches of said first silicon substrate, so that the exterior corners present in the filter are dimensionally controlled;

(c) producing an equally spaced, linear array of parallel grooves in the first substrate, the grooves opening into the manifold at one end and penetrating through an edge of the first substrate at the other end;

(d) forming an equally spaced linear array of resistive material on an insulative surface of a second silicon substrate for use as heating elements and depositing a pattern of electrodes on the same second substrate surface for enabling selective addressing of each heating element with current pulses, the distance between heating elements being the same distance as that between the grooves in the first substrate; and (e) aligning and bonding the first and second substrates together so that the surface of the first substrate having the manifold, particle filter, and grooves confront the surface of the second substrate with the heating elements and electrodes and so that the manifold with particle filter is enclosed and a heating element lies within each groove a predetermined distance from the manifold and thus also a predetermined distance from the groove end penetrating the first substrate edge, the two substrates thereby forming channels out of the grooves and forming nozzles out of the groove penetrations through first substrate edge.

4. The method of claim 3 wherein the grooves are produced by dicing.

5. The method of claim 3 wherein the grooves of step (c) are concurrently produced with the manifold and particle filter during the etching step (b), except that the grooves do not penetrate the edge of the second substrate, thus combining steps (b) and (c); and wherein the method further comprises step (f) wherein a single dicing cut perpendicular to the grooves removes a portion of both the bonded first and second substrates a predetermined distance from the manifold to produce the nozzles.

6. A method for fabricating a printhead for use in an ink jet printing device having an internal filtering means, comprising the steps of:

(a) cleaning first and second silicon substrates, each having first and second parallel surfaces, the second substrate surfaces being (100) planes;

(b) depositing a layer of insulative material on at least the first surface of the first substrate and depositing a layer of masking material on the surfaces of the second substrate, the masking material having good adhesion to the second substrate surfaces and being resistive to attack from anisotropic etchants;

(c) forming an equally spaced, linear array of resistive material on the first surface of the first substrate for use as heating elements and forming a pattern of electrodes on the same substrate surface for enabling individual addressing of each heating element with current pulses;

(d) photolithographically patterning the masking layer on the second surface of the second substrate to produce a via of predetermined size and location therein for subsequent use as a fill hole for the printhead;

(e) anisotropically etching the second surface of the second substrate to etch a fill-hole recess having a depth of less than the second substrate thickness, the recess being bounded by (111) plane side walls;

(f) photolithographically patterning the masking layer on the first surface of the second substrate to produce a plurality of vias at selective locations therein, the shape of each via being predetermined for anisotropic etching of the exposed portions of the first surface of the second substrate, the plurality of vias including one for a manifold, a predetermined number of parallel, elongated vias for ink channels, and set of vias inside the manifold via defining a wall pattern for use in producing an internal, totally surrounded chamber, the wall defining pattern for the chamber having small vias therein for use in producing a number of pits in the top surface thereof, the elongated channel vias being perpendicular to one side of the manifold via and spaced therefrom a predetermined distance, these ends of the channel vias closer to the manifold via being shorter in distance than the distance between the other ends of the channel vias from a one of the second substrate edges, and the distances of the pit vias from the manifold via and chamber via being about equal to the distance between the channel vias and the manifold, the width of the pit vias being smaller than the widths of the channel vias;

(b) anisotropically etching the first surface of the second substrate for a predetermined period of time to produce recesses according to the pattern of vias, each recess being bounded by (111) plane side walls, the etching time period being sufficient to cause the manifold and internal chamber recess depth to intersect the fill-hole recess and open a path of communication therebetween;

(h) isotropically etching the second substrate for a period of time sufficient to permit complete undercutting of the masking layer between the channel recesses and the manifold recess as well as between the pit recesses and opposing side walls of the internal chamber;

(i) cleaning the second substrate to stop the isotropic etching process;

(j) anisotropically etching the second substrate again for a predetermined time in order to open the channel recesses to the manifold recess and to form passageways at the undercut pit recesses between the chamber and the surrounding manifold;

(k) applying an adhesive to the masking layer on the first surface of the second substrate, taking care not to permit the adhesive to run into any of the recesses;

(l) aligning the first and second substrates with their first surfaces confronting and contacting each other, so that each channel recess contains a heating element therein;

(m) curing the adhesive to bond the first and second substrates together to form the printhead; and (n) dicing the channels open in a plane perpendicular to the channels, so that the open ends may serve as nozzles with the heating elements being spaced a predetermined distance upstream thereof, filtered ink being provided to the channels by a flow of ink into the internal chamber from the fill hole, through the passageways between the internal chamber and the manifold whereat filtering is accomplished because the passageways have smaller cross-sectional flow areas than the channels, and into the channels from the manifold.

7. The method of claim 6, wherein the method further comprising the step of removing the insulative layer from the first surface of the second substrate prior to the adhesive applying step (k).

8. The method of claim 6, wherein the patterning and etching of the elongated channels are omitted and wherein the channels are produced by dicing prior to the adhesive applying step (k); and wherein the dicing during step (n) provides nozzles in a plane perpendicular to the diced channels, so that each nozzle has appropriate directionality and the proper spacing from the heating elements.

9. The method of claim 6, wherein the wall pattern for producing the internal, totally surrounded chamber has a serpentine configuration, so that the lineal perimeter dimension thereof is increased thus enabling an increase in the number of pits on the top surface of the serpentine wall, whereby steps (h) through (j) provide an increase in the number of passageways, so that the ink replenishment of the ink channels is not impeded, even if a large number of nozzles emit droplets concurrently or if some of the filtering passageways are clogged.

10. A method of fabricating a plurality of thermal ink jet printheads from first and second silicon wafers, each having first and second parallel surface, the second wafer surfaces being (100) planes;

(a) depositing a layer of insulative material on at least the first surface of the first wafer and depositing a layer of masking material on the surfaces of the second wafer;

(b) forming a plurality of equally spaced, linear arrays of resistive material on the first surface of the first wafer for use as heating elements and subsequently depositing a plurality of patterns of electrodes on the same wafer surface for enabling the selective addressing of each heating element in each array with current pulses and concurrently depositing at least two alignment marks at predetermined locations;

(c) photolithographically patterning the masking layer on the second (100) surface of the second wafer to produce a plurality of vias of predetermined size and location therein for subsequent use as a fill hole for each of the printheads and to produce at least two separate alignment vias of predermined size and locations for subsequent use in aligning the second wafer with the alignment marks on the first wafer;

(d) anisotropically etching the second surface of the second wafer to etch a plurality of fill hole recesses having depths equal to less than the thickness of the second wafer and to etch at least two alignment holes through said second wafer;

(e) photolithographically patterning the masking layer on the first surface of the second wafer to produce a plurality of sets of vias therein; the shape and location of each via in each set of vias being designed for anisotropic etching of the exposed portions of the first surface of the second wafer, so that no exterior corner is included in the patterned vias, each set of vias including one for a manifold recess, a predetermined number of parallel elongated vias for ink channel recess, four boundary recesses defining and surrounding each portion of the wafer surface that will form part of a single printhead, and a set of vias inside the manifold via defining a wall patterned for use in producing an internal, totally surrounded chamber, the wall defining pattern for the chamber having a plurality of small vias therein for use in producing a plurality of pits in the top surface thereof, the elongated channel vias being perpendicular to one side of the manifold vias and spaced therefrom a predetermined distance, these ends of the channel vias which are closer to the manifold via being shorter in distance than the distance between the other ends of the channel vias and a one of the boundary vias, and the distances of the pit vias from the manifold via and chambers via being about equal to the distance between the channel vias and the manifold via, the width of the pit vias being smaller than the widths of the channel vias;

(f) anisotropically etching the first surface of the second wafer for a predetermined period of time to produce recesses according to the pattern of vias, each recess being bounded by (111) plane side walls, the etching time period being sufficient to cause the internal chamber recess depth to intersect the depth of the fill-hole recess and open a path of communication therebetween;

(g) isotropically etching the first surface of the second wafer for a period of time sufficient to permit complete undercutting of the masking layer between the channel recesses and the manifold recess as well as between the pit recesses and opposing side walls of the internal chamber;

(h) cleaning the second wafer to stop the isotropic etching process;

(i) anisotropically etching the first surface of the second wafer again for a predetermined time in order to open the channel recesses to the manifold recess and to form passageways at the undercut pit recesses between the chamber and the surrounding manifold;

(j) applying an adhesive to the masking layer on the first surface of the second wafer, taking care not to permit the adhesive to run into any of the recesses;

(k) aligning the first and second wafers with their first surfaces confronting and contacting each other using the alignment marks and alignment holes, so that each channel recess contains a heating element therein a predetermined distance from the manifold;

(l) curing the adhesive to bond the first and second wafers together to form a plurality of printheads;

(m) removing the unwanted portions of the second wafer in the vicinity of the four boundary recesses by dicing procedures which do not involve the first wafer; and (n) producing a plurality of individual printheads by dicing the first wafer, one of the dicing directions being along parallel planes containing an edge of the second wafer, as well as the first wafer, these planes being perpendicular to the channels, so that such dicing cuts simultaneously opens the channel ends, opposite the manifolds and forms the ink emitting nozzles, whereby the heating elements are a predetermined distance from the nozzles and the ink being provided to the channels by a flow of ink into the internal chamber from the fill hole, through the passageways in the wall between the internal chamber and the manifold, and then to the channels is filtered because each of the passageways have smaller cross-sectional flow areas than the channels.

11. The method of claim 10 wherein said method further comprises the step of removing the masking layer on the first surface of the second wafer prior to step (k), whereat the adhesive is applied.

12. The method of claim 10 wherein step (f) includes vias defining relatively thin interconnecting masking strips between the internal chamber walls and the manifold to eliminate all external corners during the initial anisotropic etching of step (g), during which step relatively thin interconnecting walls are produced which will be removed during steps (h) and (j), so that the uninhibited flow of ink may occur around the internal chamber in the manifold.

13. The method of claim 10 wherein the wall pattern of step (f) for producing the internal chamber has a serpentine design in order to increase the number of pits in the top surface thereof so that an increased number of passageways are formed at step (j), thus providing that the ink replenishment to the channels is not impeded, even if a large number of nozzles emit droplets concurrently or if some of the filtering passageways are clogged.

* * * * *